US008811494B2

(12) United States Patent
Saxena et al.

(10) Patent No.: US 8,811,494 B2
(45) Date of Patent: *Aug. 19, 2014

(54) LOCAL MACROBLOCK INFORMATION BUFFER

(71) Applicant: Intel Corporation, Santa Clara, CA (US)

(72) Inventors: Rahul Saxena, Sunnyvale, CA (US); Munsi A. Haque, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/726,882

(22) Filed: Dec. 26, 2012

(65) Prior Publication Data

US 2013/0114739 A1 May 9, 2013

Related U.S. Application Data

(63) Continuation of application No. 11/014,301, filed on Dec. 16, 2004, now Pat. No. 8,363,730.

(51) Int. Cl.
*H04N 7/12* (2006.01)
*H04N 11/02* (2006.01)
*H04N 11/04* (2006.01)
*H04N 7/26* (2006.01)

(52) U.S. Cl.
CPC .............................. *H04N 19/00515* (2013.01)
USPC .................................. 375/240.24; 348/420.1

(58) Field of Classification Search
CPC ................................................ H04N 19/00515
USPC .................................. 375/240.24; 348/420.1
See application file for complete search history.

(56) References Cited

U.S. PATENT DOCUMENTS

| 5,761,341 | A | 6/1998 | Go |
| 6,959,348 | B1 | 10/2005 | Chan et al. |
| 2004/0141554 | A1 | 7/2004 | Phong et al. |
| 2004/0146109 | A1 | 7/2004 | Kondo et al. |
| 2005/0047510 | A1 | 3/2005 | Yamaguchi et al. |
| 2005/0111545 | A1 | 5/2005 | Prabhakar et al. |
| 2006/0133510 | A1 | 6/2006 | Saxena et al. |

OTHER PUBLICATIONS

Thomas Wiegand, et al., "Overview of the H.264/AVC Video Coding Standard", IEEE Transactions on Circuits and Systems for Video Technology, vol. 13, No. 7, Jul. 2003, (pp. 560-576, 17 pages total).
A. Tamhankar et al., "An Overview of H.264 / MPEG-4 Part 10", EC-VIP-MC 2003, 4th EURASIP Conference focues on Video/Image Processing and Multimedia Communications, Jul. 2-5, 2003, Zagreb, Croatia, (pp. 1-51, 51 pages total).

*Primary Examiner* — Jeremaiah C Hallenbeck-Huber
(74) *Attorney, Agent, or Firm* — Buckley, Maschoff & Talwalkar LLC

(57) ABSTRACT

According to some embodiments, an external memory unit stores rows of macroblocks representing an image. A set of macroblocks may be transferred from the external memory unit to a local buffer, the set of macroblocks including fewer macroblocks than a row. A macroblock may then be decoded based on information in the local buffer to generate an image signal.

19 Claims, 9 Drawing Sheets

LOCAL MACROBLOCK INFORMATION BUFFER

CROSS-REFERENCE TO RELATED APPLICATIONS

The present application is a continuation of U.S. patent application Ser. No. 11/014,301, entitled "LOCAL MACROBLOCK INFORMATION BUFFER" and filed Dec. 16, 2004. The entire contents of that application are incorporated herein by reference.

BACKGROUND

A media player may output moving images to a display device. For example, a media player might retrieve locally stored image information or receive a stream of image information from a media server (e.g., a content provider might transmit a stream that includes high-definition image frames to a television, a set-top box, or a digital video recorder through a cable or satellite network). In some cases, the image information is encoded to reduce the amount of data used to represent the image. For example, an image might be divided into smaller image portions, such as macroblocks, so that information encoded with respect to one image portion does not need to be repeated with respect to another image portion (e.g., because neighboring image portions may frequently have similar color, brightness, and/or motion characteristics). As a result, information about neighboring image portions may be locally stored and accessed by a decoding engine in the media player when a particular image portion is decoded. Such an approach may require a significant amount of local storage space or be otherwise impractical.

DETAILED DESCRIPTION

Figure 1:
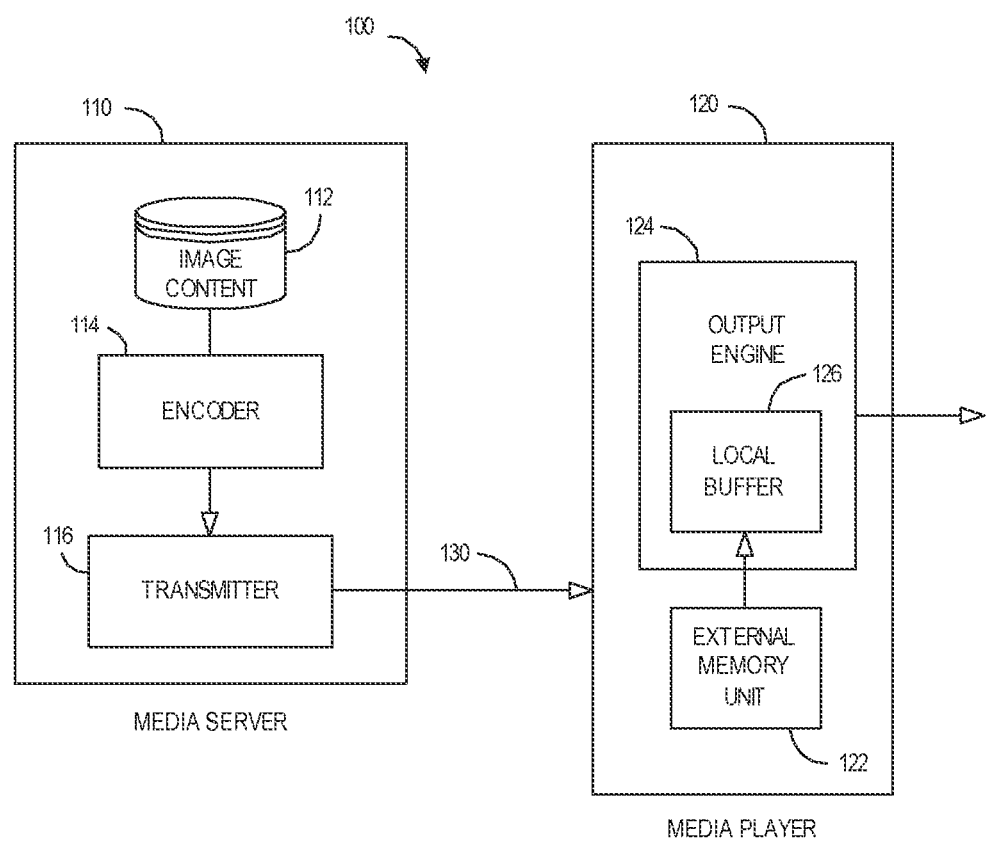
FIG. 1 is a block diagram of a media system.

A media player may receive image information, decode the information, and output a signal to a display device. For example, a Digital Video Recorder (DVR) might retrieve locally stored image information, or a set-top box might receive a stream of image information from a remote device (e.g., a content provider might transmit a stream that includes high-definition image frames to the set-top box through a cable or satellite network). FIG. 1 is a block diagram of a media system 100 including a media server 110 that provides image information to a remote media player 120 through a communication network 130.

An encoder 114 may reduce the amount of data that is used to represent image content 112 before the data is transmitted by a transmitter 116 as a stream of image information. As used herein, information may be encoded and/or decoded in accordance with any of a number of different protocols. For example, image information may be processed in connection with International Telecommunication Union-Telecommunications Standardization Sector (ITU-T) recommendation H.264 entitled "Advanced Video Coding for Generic Audiovisual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology—Coding of Audio-Visual Objects" (2001) or the MPEG2 protocol as defined by ISO/IEC document number 13818-1 entitled "Information Technology—Generic Coding of Moving Pictures and Associated Audio Information" (2000).

As other examples, image information might be processed in accordance with Microsoft Windows Media Video 9 (MSWMV9) information or Society of Motion Picture and Television Engineers (SMPTE) Video Codec-1 (VC-1) information.

A received image stream may include information (such as parameter values) associated with portions of an image, and the information associated with those portions may be stored in a memory unit 122 external to an output engine 124 or decoder. Note that information encoded with respect to one image portion might be re-used with respect to another image portion. As a result, the output engine 124 may transfer information about neighboring portions from the external memory unit 122 into a block-based local parameter buffer or cache 126. The output engine 124 may then access that information from the local buffer 126 to re-construct or decode each image portion. According to some embodiments, the local buffer 124 is formed on the same die as the output engine 124.

Figure 2:
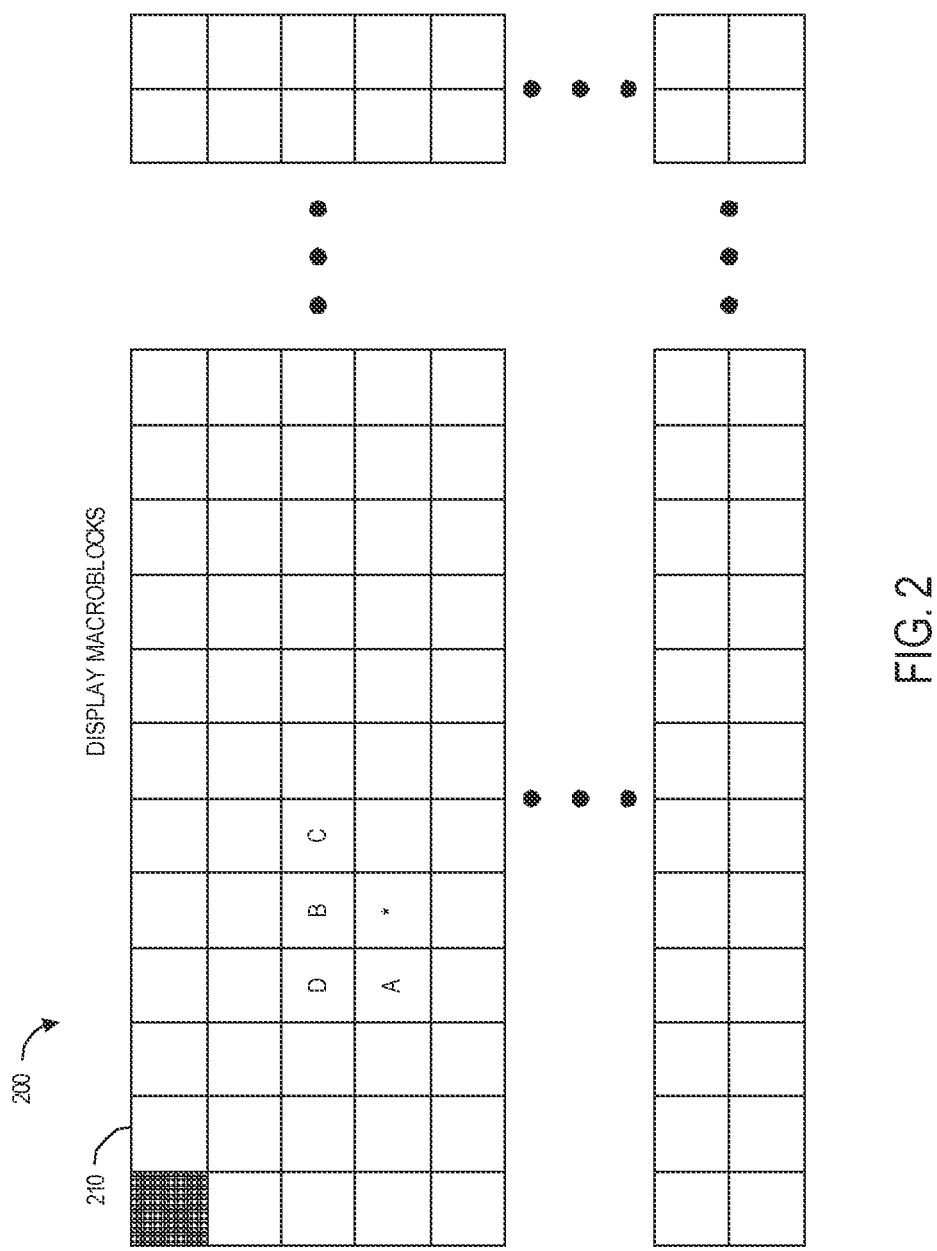
FIG. 2 illustrates a display divided into macroblocks.

Consider, for example, H.264 image information. As illustrated in FIG. 2, a display image 200 may be divided into an array of "macroblocks" 210. Each macroblock might represent a 16×16 set of picture samples or pixels. Moreover, the array may include rows, each row having, for example, one hundred and twenty macroblocks 210.

The output engine 124 may decode macroblocks 210 from left to right across rows of macroblocks 210 beginning with the top row. When one row is completed, the output engine 124 may begin to decode the first macroblock 210 of the next row.

Note that information about one macroblock 210 may have been encoded using information about neighboring macroblocks (e.g., because neighboring macroblocks 210 may frequently have similar characteristics). As a result, when a particular macroblock 210 is being decoded and/or decompressed, information about that macroblock 210 may be derived using a predicted value from one or more neighboring blocks. In some cases, a predicted parameter is derived from a single neighboring block's parameter while in other cases it is derived from parameters associated with multiple neighboring blocks.

In particular, consider the macroblock "*" illustrated in FIG. 2. To decode macroblock *, the output engine 124 may use parameter values previously determined for neighboring macroblocks A, B, C, and/or D to determine a predicted parameter value for macroblock *. A difference between the predicted parameter value and the actual parameter value may be received in the stream of image information, and the output engine 124 can use the predicted parameter value and this difference to generate the actual parameter value. The actual parameter value may then be used to generate an output representing the original image content 112 (as well as being used when determining an actual parameter value for a subsequent neighboring macroblock).

Figure 3:
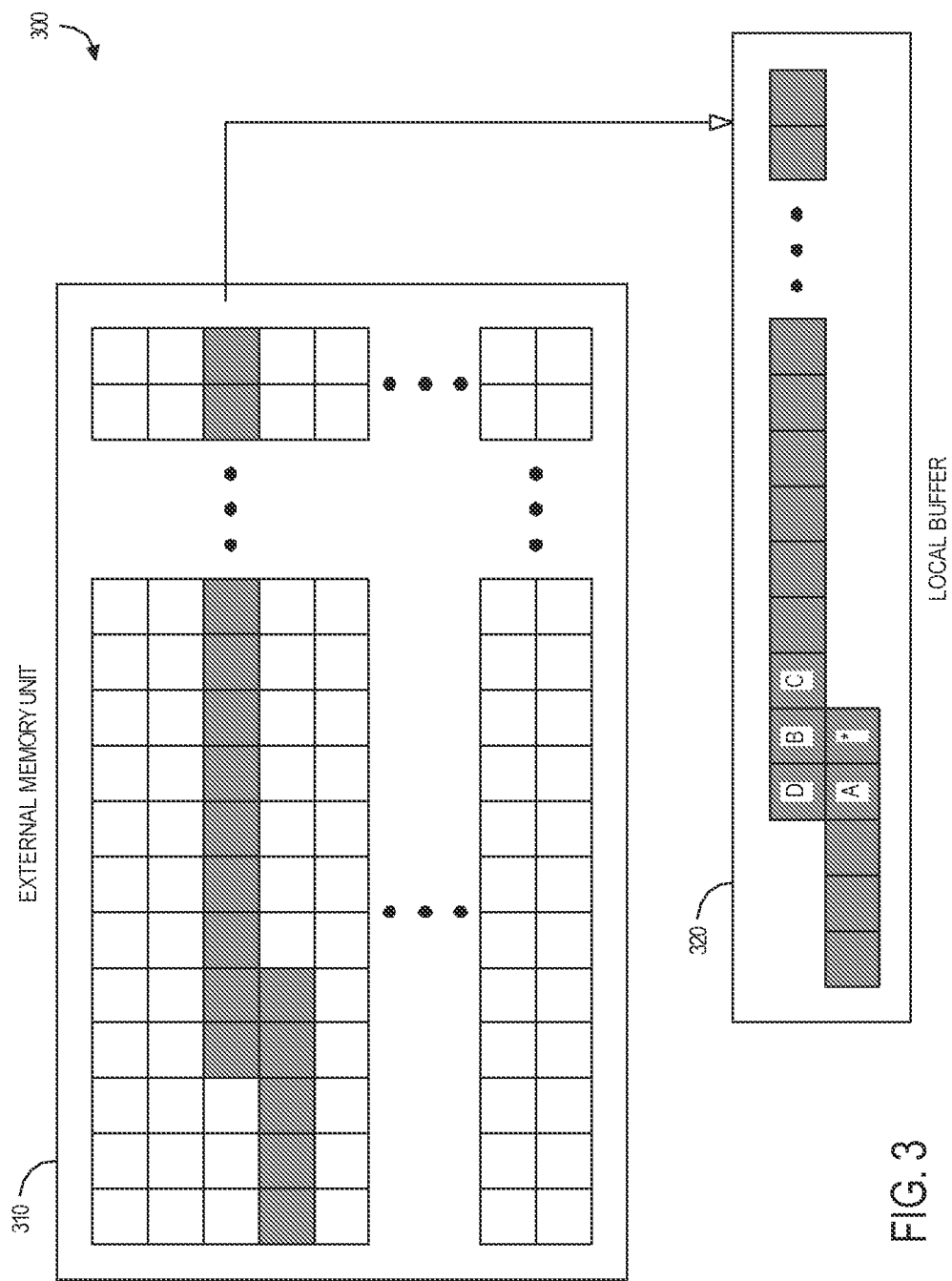
FIG. 3 is a block diagram of a system in which macroblock information is stored in an external memory unit and a local buffer.

To efficiently decode the macroblocks 210, the output engine 124 may transfer information about the macroblock being decoded and one or more neighboring macroblocks from the external memory unit 122 to the local buffer 126. For example, FIG. 3 is a block diagram of a system 300 in which macroblock information is stored in an external memory unit 310 and a local buffer 320. Each square in FIG. 3 may represent, for example, a macroblock buffer containing reference data or parameters for a particular macroblock. In some cases, at least one row's worth of macroblock information (illustrated by the shaded area of FIG. 3) may be transferred from the external memory unit 310 to the local buffer 320. As a result, an output engine can decode macroblock * using locally stored information associated with macroblocks A, D, B, and/or C. Examples of information that might be processed in this way include an x-direction motion vector, a y-direction motion vector, intra-prediction mode data, and/or a reference frame indices list.

After macroblock * is decoded, the output engine may begin to decode the macroblock to the right of macroblock * (and macroblock * will now become macroblock A, macroblock B will now become macroblock D, etc.).

Such an approach may require a significant amount of on-die storage space or be otherwise impractical. Consider, for example, a high definition resolution image having 1920× 1080 picture samples. If each macroblock is a 16×16 set of picture samples, the number of macroblocks in a row is 1920/ 16=120. Thus, the local memory may need to store information about 120 macroblocks along with the macroblock currently being decoded, for a total of 121 macroblocks. Assuming each macroblock is associated with 256 bits of information, the local buffer would need to store 121×256 bits, or approximately 31 Kilobits (Kbits) of data. In some cases, it may be impractical to locally store that amount of information, such as when the output engine 124 is associated with a System on Chip (SoC) design.

Figure 4:
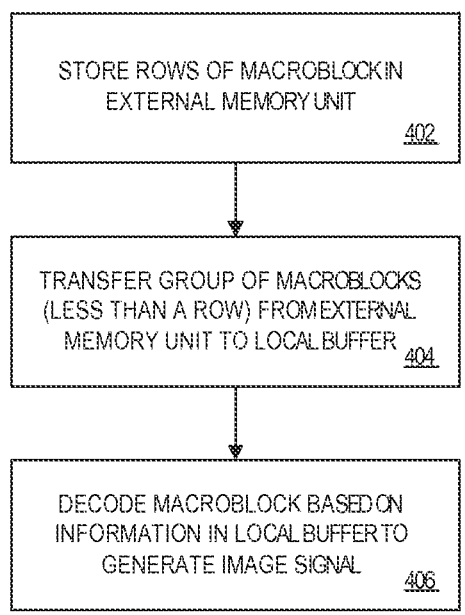
FIG. 4 is a flow diagram illustrating a method according to some embodiments.

FIG. 4 is a flow diagram illustrating a method according to some embodiments. The method may be associated with, for example, media player 120 of FIG. 1. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 402, rows of macroblocks representing an image are stored in an external memory unit. The external memory unit might comprise, for example, a Double Data Rate (DDR) Synchronous Dynamic Random Access Memory (SDRAM) unit of a media player.

Figure 5:
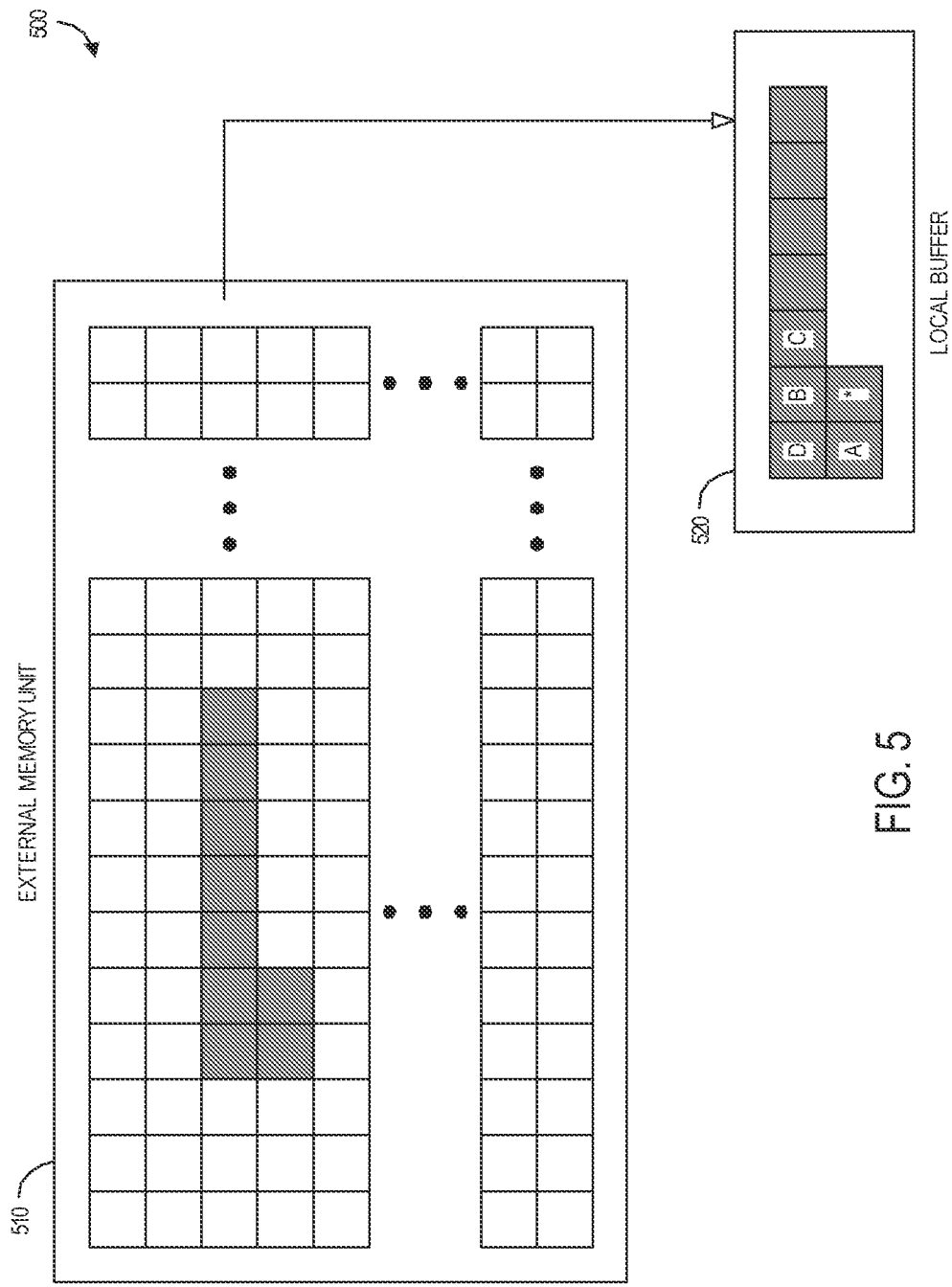
FIG. 5 is a block diagram of a system 300 in which macroblock information is stored in an external memory unit and a local buffer according to some embodiments.

A set of macroblocks are then transferred at 404 from the external memory unit to a local buffer, and the set may include fewer macroblocks than a row. The local buffer might be, for example, an on-chip buffer associated with an output engine. For example, FIG. 5 is a block diagram of a system 500 in which macroblock information is stored in an external memory unit 510 and a local buffer 520 according to some embodiments. In this example, the macroblock information may be associated with Picture-Adaptive Frame/Field (PAFF) H.264 coding.

In particular, the external memory unit 510 stores information associated with rows of moving image macroblocks. The local buffer 520 may be local to a decoder and may store less than one row's worth of information. In the example shown in FIG. 5, the local buffer 520 stores parameters for: (i) the macroblock currently being decoded (*), (ii) the neighboring blocks needed to construct the current macroblock (A, B, C, and D), and (iii) four additional macroblocks. Referring again to FIG. 4, the current macroblock * is then decoded based on information in the local buffer at 406 to generate an image signal.

The local buffer 520 may be, for example, a circular buffer, and a buffer manager may arrange for new information to replace old information (e.g., after the old information is no longer needed). For example, after macroblock * is decoded, macroblocks A and D will not be needed (while macroblock B will become macroblock D, macroblock * will become macroblock A, and macroblock C will become macroblock B during construction of the next macroblock). Note that when macroblock * is near the end of a row, additional macroblocks from the beginning of the next row may be stored in the local buffer 520.

Figure 6:
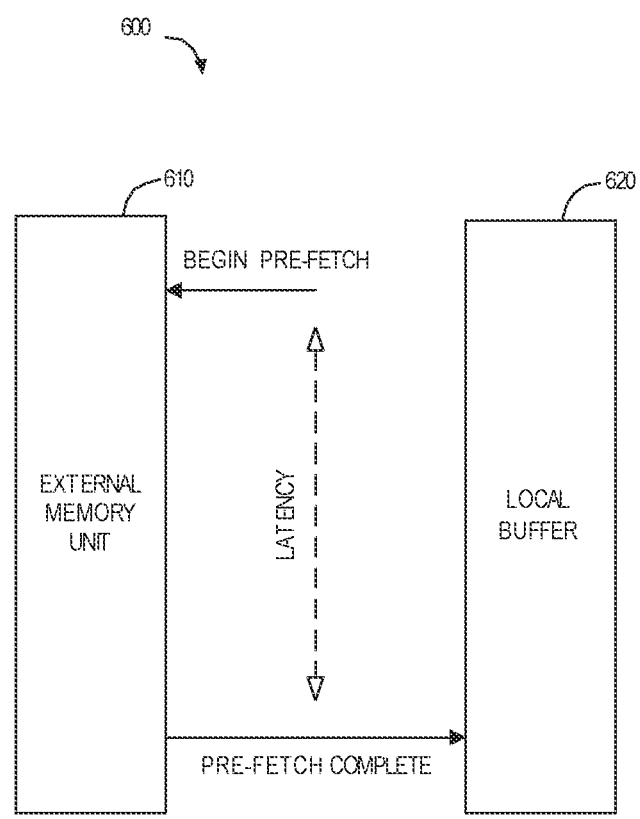
FIG. 6 is a block timing diagram illustrating a pre-fetch latency according to some embodiments.

The number of additional macroblocks stored in the local buffer (e.g., in addition to the macroblocks *, A, B, C, and D which are currently being used) may depend on a latency associated with the external memory unit 510. For example, FIG. 6 is a block timing diagram 600 illustrating a pre-fetch latency according to some embodiments. In particular, there may be a latency between the time a pre-fetch of an additional macroblock from the external memory unit 610 is initiated and the time that the pre-fetch is completed (e.g., and the information is available in the local buffer 620). Note that the actual latency of a pre-fetch might vary during operation (e.g., due to bandwidth or other issues), and a value L may be selected based on, for example, a maximum expected latency.

The number of additional macroblocks that may be stored in the local buffer 620 may be based on L and the amount of time it takes to decode each macroblock. For example, if four macroblocks can be decoded during L, then four additional macroblocks might be stored in the local buffer 620. Thus, when a current macroblock is about to be decoded, four additional macroblocks may be present in the local memory 620. At this time, a new pre-fetch of a new macroblock may be initiated. By the time the current macroblock in the local buffer 620 is decoded, the new macroblock will be available (and another pre-fetch may be initiated). According to another embodiment, batches to macroblocks might be pre-fetched to ensure that at least an appropriate number of additional macroblocks are available in the local memory 620.

Consider again a high definition resolution image having 1920×1080 picture samples, with each macroblock being a 16×16 set of picture samples (e.g., there are 120 macroblocks in each row). Moreover, assume that four macroblocks may be decoded during the pre-fetch latency L. Thus, the local memory 620 may store parameters for the macroblock currently being decoded, the four neighboring macroblocks needed to construct the current macroblock, and four additional macroblocks (a total of nine macroblocks). If we again assume that each macroblock is associated with 256 bits of information, the local buffer 620 would need to store 9×256 bits or approximately 2.3 Kbits of data (as compared to the 31 Kbits described with respect to FIG. 3).

Figure 7:
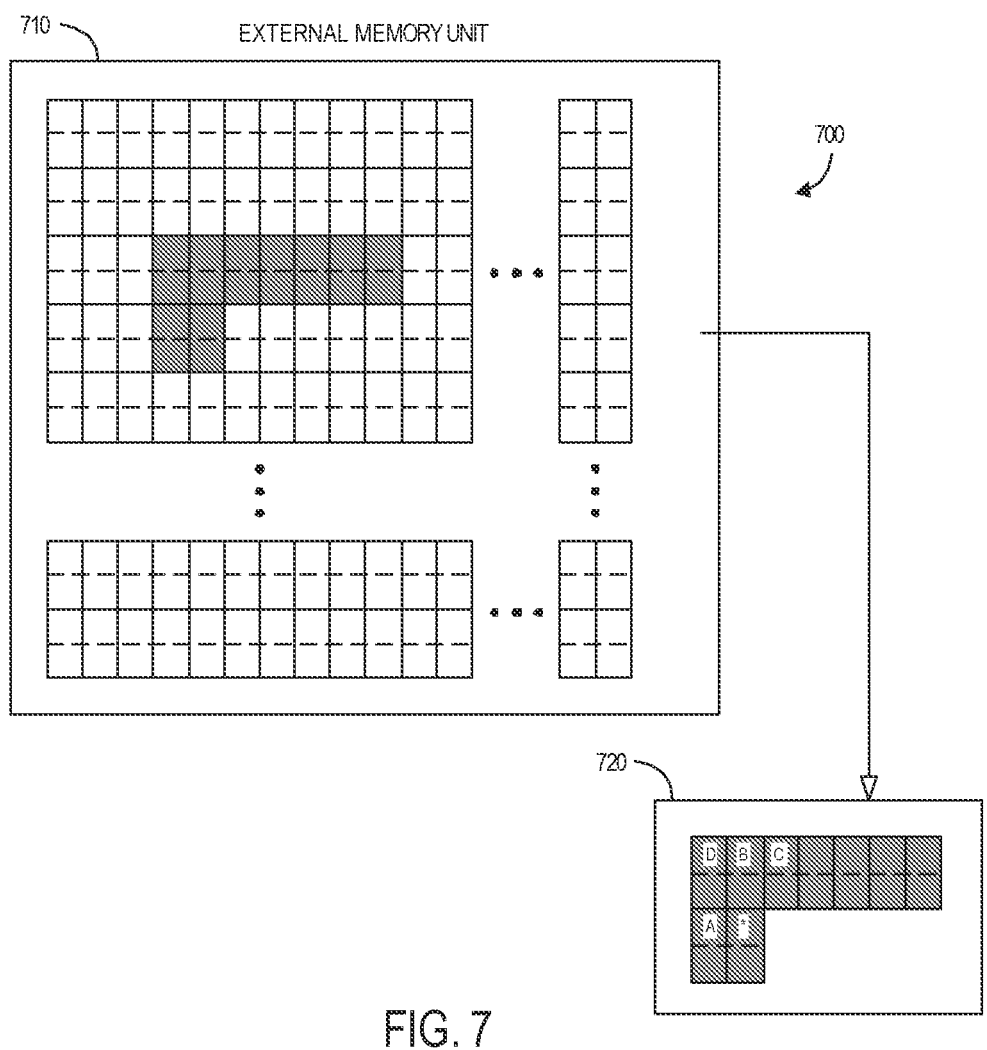
FIG. 7 is a block diagram of a system in which macroblock-adaptive frame/field coding information is stored in an external memory unit and a local buffer according to some embodiments.

While some embodiments have been described with respect to PAFF frames, note that embodiments may be associated with a Macroblock-Adaptive Frame/Field (MBAFF) coding implementation in which pairs of vertically adjacent macroblocks may be processed. For example, FIG. 7 is a block diagram of a system 700 in which MBAFF coding information is stored in an external memory unit 710 and a local buffer 720 according to some embodiments. The dashed lines separate pairs of vertically adjacent macroblocks that may be simultaneously constructed. Note that twice as much information may be stored in the local buffer 720 as compared to a PAFF implementation (e.g., illustrated in FIG. 5).

Figure 8:
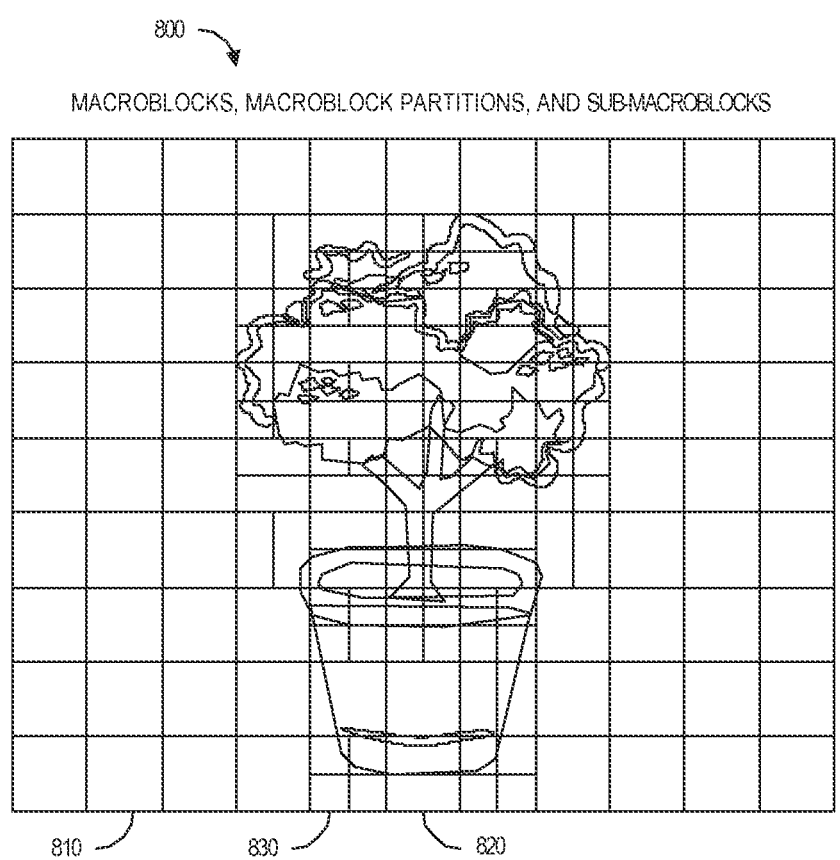
FIG. 8 illustrates macroblocks, macroblock partitions, and sub-macroblocks according to some embodiments.

Moreover, while some embodiments have been described with respect to macroblocks, embodiments may be associated with other types of image portions. For example, FIG. 8 illustrates a display 800. In this case, portions of the display 800 that are substantially similar (e.g., a background area) might be encoded as macroblocks 810. Other portions that contain more detailed image information, however, might be further divided into macroblock partitions 820 and sub-macroblocks 830. Moreover, the display 800 may be divided in different ways as the image changes. According to some embodiments, the information in a local memory may be associated with macroblocks, macroblock partitions, and/or sub-macroblocks. As used herein, the term "macroblock" may refer to any image portion including a standard H.264 macroblock, a macroblock partition, a sub-macroblock, and/or a portion defined by another standard.

Figure 9:
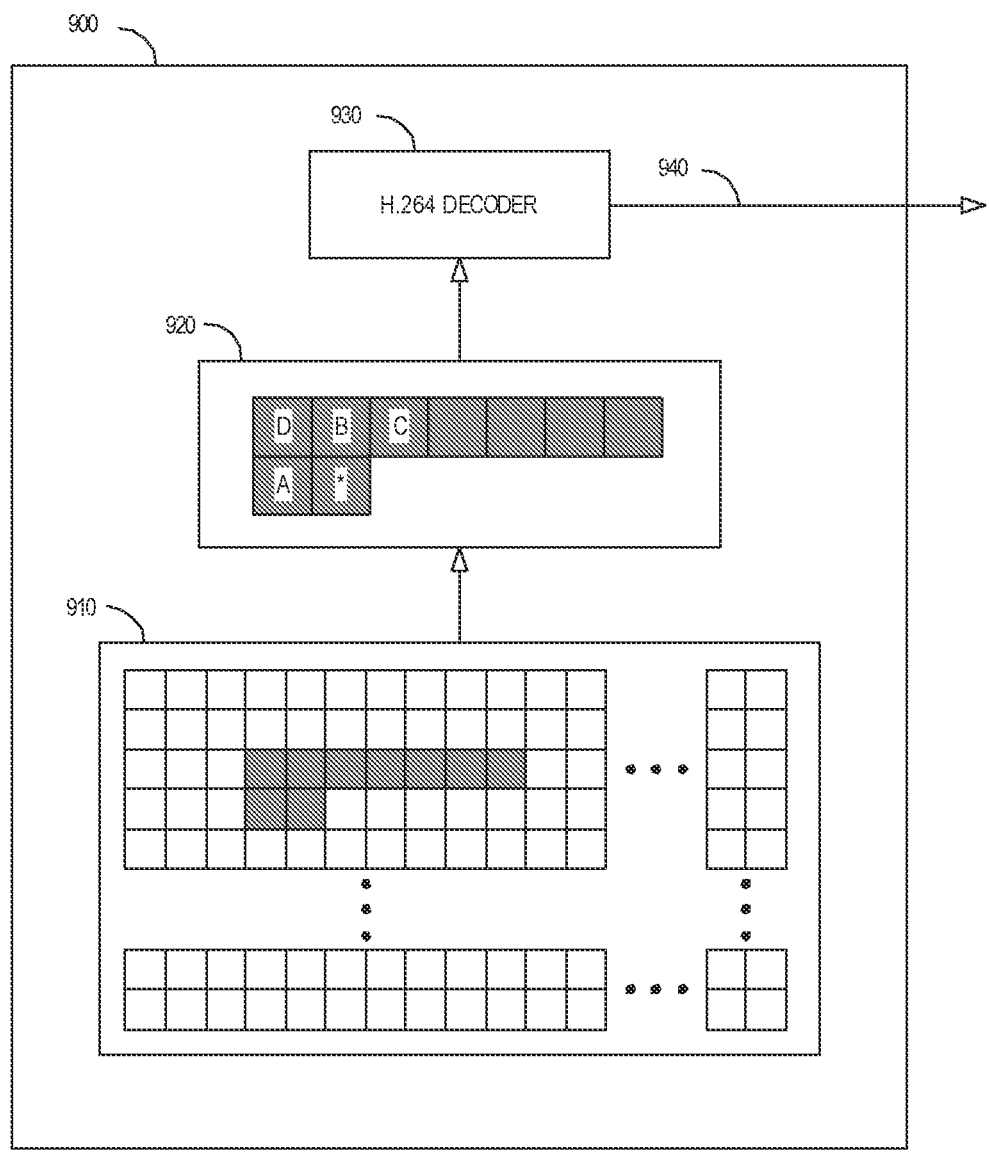
FIG. 9 is a block diagram of a system according to some embodiments.

FIG. 9 is a block diagram of a system 900 according to some embodiments. The system 900 might be associated with, for example, a digital display device, a television such as a High Definition Television (HDTV) unit, a DVR, a game console, a Personal Computer (PC) or laptop computer, and/or a set-top box (e.g., a cable or satellite decoder).

The system 900 includes a data storage device 910, such as a DDR SDRAM device, and a buffer 920 associated with a H.264 decoder 930 that may operate in accordance with any of the embodiments described herein. For example, the data storage device 910 may store information associated with rows of moving image macroblocks. The buffer 920 and H.264 decoder 930 may comprise an Integrated Circuit (IC), and the buffer 920 may store information received from the data storage device 910 for a group of macroblocks, the group including fewer macroblocks than a row. The H.264 decoder 930 may the generate an image signal in accordance with the information in the buffer 920 (including parameters associated with neighboring macroblocks). According to some embodiments, the output H.264 decoder 930 generates information that is provided to a display device (not illustrated in FIG. 9) via a digital output 940. Moreover, the system 900 might further include an input interface (not illustrated in FIG. 9) to receive a signal associated with at least one of: (i) H.264 information, (ii) MPEG2 information, or (iii) MPEG4 information.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although a single output engine or decoder was described, embodiments may be associated with multiple output engines or decoders (and multiple or shared local buffers may be provided).

Moreover, although particular image processing protocols and networks have been used herein as examples (e.g., H.264 and MPEG4), embodiments may be used in connection any other type of image processing protocols or networks, such as Digital Terrestrial Television Broadcasting (DTTB) and Community Access Television (CATV) systems.

The several embodiments described herein are solely for the purpose of illustration. Persons skilled in the art will recognize from this description other embodiments may be practiced with modifications and alterations limited only by the claims.

What is claimed is:

1. A method, comprising:
   storing, in an external memory unit, rows of macroblock information representing an image;
   transferring information associated with a set of macroblocks from the external memory unit to a local buffer, the set of macroblocks having fewer macroblocks than a row and including (i) a current macroblock to be decoded, (ii) neighboring macroblocks to be used to decode the current macroblock, and (iii) non-neighboring macroblocks associated with a subsequent macroblock to be decoded after the current macroblock, wherein the number of macroblocks in the set is based at least in part on a latency between the local buffer beginning a pre-fetch process and the external memory unit completing that pre-fetch process; and
   decoding a macroblock based on information in the local buffer to generate an image signal.

2. The method of claim 1, wherein said decoding is based on information associated with the macroblock being decoded and information associated with at least one neighboring macroblock.

3. The method of claim 1, wherein the local buffer comprises a circular on-chip buffer.

4. The method of claim 1, wherein the external memory unit comprises a double data rate synchronous dynamic random access memory unit.

5. The method of claim 1, wherein the rows of macroblocks are associated with at least one of: (i) picture-adaptive frame/field coding, or (ii) macroblock-adaptive frame/field coding.

6. The method of claim 1, wherein the macroblock is associated with at least one of: (i) H.264 information, (ii) Motion Picture Experts Group 2 information, (iii) Motion Picture Experts Group 4 information, (iv) Microsoft Windows Media Video 9 information, or (v) or Society of Motion Picture and Television Engineers Video Codec-1 information.

7. The method of claim 1, wherein said decoding is associated with at least one of: (i) a digital display device, (ii) a television, (iii) a digital video recorder, (iv) a game device, (v) a personal computer, or (vi) a set-top box.

8. An apparatus, comprising:
   an off-chip memory unit to store information associated with rows of moving image portions;
   an on-chip buffer to store information received from the off-chip memory unit associated with a group of image portions, the group having fewer image portions than a row, wherein the group of image portions includes information associated with a current image portion to be decoded and non-neighboring image portions associated with a subsequent image portion to be decoded after the current image portion, and further wherein the number of image portions in the group is based at least in part on (i) an image portion decode time and (ii) a latency between the on-chip buffer beginning a pre-fetch process and the off-chip memory unit completing that pre-fetch process; and an on-chip decoding engine to generate an image signal in accordance with the information in the local buffer.

9. The apparatus of claim 8, wherein said on-chip decoding engine is to generate the image signal based on an image portion being decoded and information associated with neighboring image portions.

10. The apparatus of claim 8, wherein the on-chip buffer comprises a circular buffer and further comprising:
a buffer manager.

11. The apparatus of claim 8, wherein the off-chip memory unit comprises a random access memory unit.

12. The apparatus of claim 8, wherein the image portion information is associated with at least one of: (i) picture-adaptive frame/field coding, or (ii) image portion-adaptive frame/field coding.

13. The apparatus of claim 8, wherein said decoding engine is associated with at least one of: (i) H.264 information, (ii) Motion Picture Experts Group 2 information, (iii) Motion Picture Experts Group 4 information, (iv) Microsoft Windows Media Video 9 information, or (v) or Society of Motion Picture and Television Engineers Video Codec-1 information.

14. An apparatus comprising:
a storage medium having stored thereon instructions that when executed by a machine result in the following:
storing, in an external memory unit, an array of macroblock information representing an image, the array having rows;
transferring a set of macroblock information from the external memory unit to a local buffer, the set being associated with fewer macroblocks than a row of the array, the set including information associated with a current macroblock to be decoded and non-neighboring macroblocks associated with a subsequent macroblock to be decoded after the current macroblock, wherein the number of macroblocks in the set is based at least in part on a latency between the local buffer beginning a pre-fetch process and the external memory unit completing that pre-fetch process; and
decoding a macroblock based on information in the local buffer to generate an output.

15. The apparatus of claim 14, wherein the macroblock information includes at least one of: (i) an x-direction motion vector, (ii) a y-direction motion vector, (iii) an intra-prediction mode, or (iv) a reference frame indices list.

16. The apparatus of claim 14, wherein execution of said instructions further results in:
providing the output to a display device.

17. A system, comprising:
a data storage device to store information associated with rows of moving image macroblocks;
an integrated circuit, including:
a buffer to store information received from the data storage device associated with a group of macroblocks, the group having fewer macroblocks than a row, the set including macroblocks associated with a current macroblock to be decoded and non-neighboring macroblocks associated with a subsequent macroblock to be decoded after the current macroblock, wherein the number of macroblocks in the set is based at least in part on a latency between the local buffer beginning a pre-fetch process and the external memory unit completing that pre-fetch process;
an output engine to generate an image signal in accordance with the information in the buffer; and
a digital interface to provide a digital signal from the output engine to a digital display device.

18. The system of claim 17, further comprising:
an input interface to receive a signal associated with at least one of: (i) H.264 information, (ii) Motion Picture Experts Group 2 information, (iii) Motion Picture Experts Group 4 information, (iv) Microsoft Windows Media Video 9 information, or (v) or Society of Motion Picture and Television Engineers Video Codec-1 information.

19. The system of claim 17, wherein the system is associated with at least one of: (i) a digital display device, (ii) a television, (iii) a digital video recorder, (iv) a game device, (v) a personal computer, or (vi) a set-top box.

* * * * *